United States Patent [19]

Honjo et al.

[11] Patent Number: 5,477,399
[45] Date of Patent: Dec. 19, 1995

[54] PROGRAMMABLE TENSION CONTROL OF A VARIABLE SPEED RECORDER

[75] Inventors: Ryoki Honjo; Hiroaki Oishi, both of Tokyo, Japan

[73] Assignee: Sony Corporation, Tokyo, Japan

[21] Appl. No.: 826,516

[22] Filed: Jan. 27, 1992

[30] Foreign Application Priority Data

Jan. 31, 1991 [JP] Japan ...................... 3-032091

[51] Int. Cl.⁶ .................................................. G11B 15/43
[52] U.S. Cl. ..................... 360/73.07; 360/73.05; 242/334.6
[58] Field of Search ................ 360/73.07, 73.05; 242/334.1, 334.6

[56] References Cited

U.S. PATENT DOCUMENTS

| | | | |
|---|---|---|---|
| Re. 29,921 | 2/1979 | Cherry et al. | 360/73.05 |
| 2,658,398 | 11/1953 | Masterson | 360/73.05 X |
| 4,341,363 | 7/1982 | Inatome | 360/73.05 X |
| 4,348,699 | 9/1982 | Tsuchiya et al. | 360/73.07 X |
| 4,382,268 | 5/1983 | Frimet | 360/73.05 |
| 5,045,954 | 9/1991 | Oishi et al. | 360/8 |

*Primary Examiner*—Andrew L. Sniezek
*Assistant Examiner*—James T. Wilson
*Attorney, Agent, or Firm*—William S. Frommer; Alvin Sinderbrand

[57] ABSTRACT

A magnetic recording and/or reproducing apparatus is capable of recording or reproducing data at variable speeds. The value of the tape tension applied to a magnetic tape is set in accordance with the data rate of an input data signal received through an input data processing circuit and a recording signal processing circuit or the data rate of an output data signal output through a reproduction signal processing circuit. The data rate can be set to any one of 256, 128, 64, 32, 16 and 10 [Mbps]. The use of a tape tension value that is appropriate to the data rate, and to corresponding head drum rotation and tape advancement rates, allows the distance between a recording track TR and the control signal CTL corresponding to the recording track TR is kept substantially uniform, whereby the compatibility among different data rates is improved.

3 Claims, 4 Drawing Sheets

| DATA RATE | TENSION |
|---|---|
| 1/1 | 42 g |
| 1/2 | 32 g |
| 1/4 | 30 g |
| 1/8 | 30 g |
| 1/16 | 28 g |
| 1/24 | 28 g |

| DATA RATE | TENSION |
|---|---|
| 1/1 | 42 g |
| 1/2 | 32 g |
| 1/4 | 30 g |
| 1/8 | 30 g |
| 1/16 | 28 g |
| 1/24 | 28 g |
FIG.4
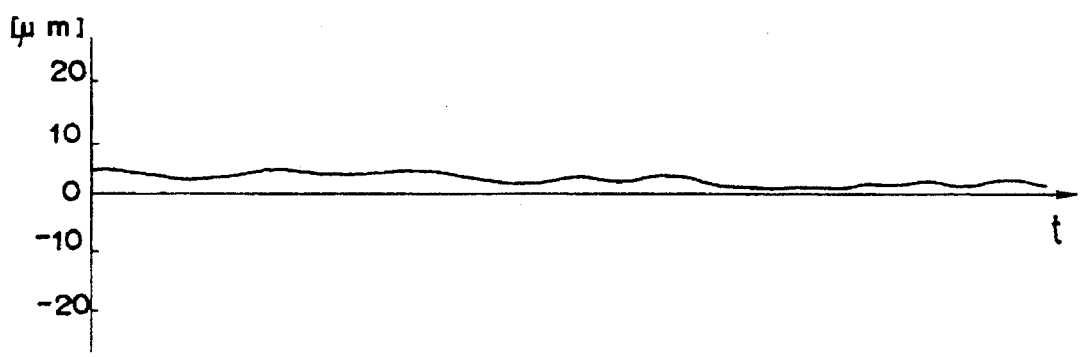
FIG.5
(PRIOR ART)
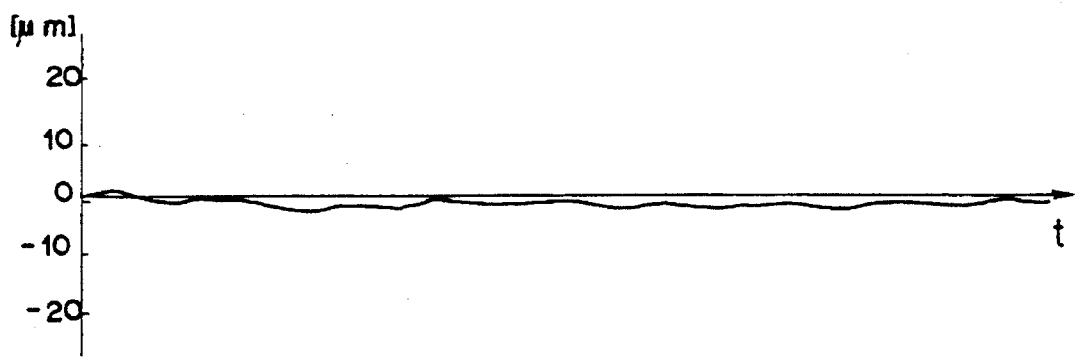
FIG.6

PROGRAMMABLE TENSION CONTROL OF A VARIABLE SPEED RECORDER

BACKGROUND OF THE INVENTION

The present invention relates to a magnetic recording and/or reproducing apparatus, and may be applied, for example, to a data recorder for recording and/or reproducing a digital signal to and/or from a magnetic tape by using a magnetic head mounted on a rotary drum.

A known high-density data recorder is based on a helical scanning type digital video tape recorder.

In this recorder a magnetic tape is wound around the drum of the data recorder so that the magnetic tape travels obliquely, whereby a rotary head mounted on the drum scans on the magnetic tape by a helical scanning system.

In this data recorder, information data is usually recorded at a standard data rate of 256 [Mbps], and a magnetized pattern inverted at predetermined intervals is formed on the recording track of the magnetic tape.

In this data recorder, the rotating speed of the head and the traveling speed of the magnetic tape are subject to variation so that the relative speed in a recording track direction between the recording tape and the head may be 1/1, 1/2, 1/4, 1/8 and 1/16 times the standard speed, for example, and the information data can be recorded or reproduced at a data rate of 256, 128, 64, 32, 16 and 10 [Mbps], that is, by using a recording signal having a maximum recording frequency of 128, 64, 32, 16, 10 and 5 [MHz].

Therefore, when the relative speed in the recording track direction between the magnetic tape and the head is set to 1/2 times for information data recorded at a data rate of 256 [Mbps] (i.e. recorded at 1/1 times speed) by using a recording signal having a maximum recording frequency of 128 [MHz], the information data can be read out as information data having a data rate of 128 [Mbps] and a maximum recording frequency of 64 [MHz], whereby the information data can be reproduced at a low relative speed of 1/2 times.

Further, when a relative speed is set to 1/1 times for information data recorded at a data rate of 64 [Mbps] (i.e. recorded at 1/4 times speed) by using a recording signal having a maximum recording frequency of 32 [MHz], the information data can be read out as information data having a data rate of 256 [Mbps], that is, having a maximum recording frequency of 128 [MHz], whereby the information data can be reproduced at a high relative speed of 4 times.

For example, by using a data recorder in which recording/reproducing operations can be effected at a relative speed that varies from 1/1 to 1/24 times, slowly changing observation data such as data obtained in an astronomical observation can be recorded at a low speed data rate such as 10 [Mbps] or the like and reproduced at a high speed data rate of 256 [Mbps] or the like, so that the observation data can be effectively analyzed in a short time by using, for example, a computer system.

Conversely, rapidly changing observation data and measurement data can be reliably analyzed at a low speed by recording the data at a high speed data rate of 256 [Mbps] or the like and reproducing the data at a low speed data rate of 10 [Mbps] or the like, so that the data recorder can be used as a buffer for frequency conversion for a large quantity of data.

Referring to FIG. 1, a conventional data recorder 1 has a magnetic tape 2 wound around a drum unit 4 through the tape guide 3 which is on the supply reel side of drum unit 4 and feeds the magnetic tape 2 to a winding reel through the tape guide 5 on the winding reel side of the drum unit 4. (Supply and winding reels not shown).

The traveling speed of the magnetic tape 2 and the rotating speed of a rotary drum 4A are increased or decreased at the same ratio in accordance with the data rate.

Nevertheless, when a data rate is changed by changing the tape travel and drum rotating speeds while keeping a tape tension uniform, the distance of the magnetic tape 2 from the drum 4 is caused to be changed in the vicinity of a tape exit (shown by the arrow a in FIG. 1) by an air flow produced by the rotation of the rotary drum 4A, so that the thickness of an air film on the surface of the rotary drum 4A is changed and the effective diameter of the rotary drum 4A may be changed accordingly.

More specifically, when the data rate is increased and the rotating speed of the rotary drum 4A is increased accordingly, the amount of separation is increased by the increased amount of air drawn in, so that the loosened portion of the magnetic tape 2 is dislocated in the direction for increasing the distance d between a recording track TR and a control signal corresponding to the recording track TR (hereinafter, referred to as a CTL distance) (FIG. 2).

By the way, the amount of dislocation of the CTL distance d can be detected from the amount of dislocation of a track height h by a CTL traverse method, and when the amount of dislocation of the track height h is 10 [μm] the amount of dislocation of the CTL distance corresponds to about 100 [μm].

Further, a problem arises in that as the data rate is increased, the linearity of the recording track TR recorded on the magnetic tape 2 is changed in the direction for increasing the effective diameter of the drum, i.e., has a downward inclination toward the right, and thus a recording pattern common to each data rate is not formed.

SUMMARY OF THE INVENTION

In view of the foregoing, an object of the present invention is to provide a magnetic recording and/or reproducing apparatus which is capable of keeping the CTL distance d and the thickness of the air film uniform regardless of the data rate of the data while recording and/or reproducing the data to and/or from a single recording format.

The foregoing objects and other objects of the present invention, have been achieved by the provision of a magnetic recording and/or reproducing apparatus which adjusts the rotating speed of a rotary drum 4A and the traveling speed of a magnetic recording tape 2 and records input data on the magnetic recording tape 2 by using the same recording wavelength as the wavelength of the input data or reproduces recorded data from the magnetic recording medium 2 at a desired data rate (256, 128, 64, 32, 16, 10 [Mbps]) even if the data rate of the recorded data (256, 128, 64, 32, 16 and 10 [Mbps]) is different. The magnetic recording and/or reproducing apparatus comprises a data rate detection means 18 for detecting the data rate of the input data (256, 128, 64, 32, 16 and 10 [Mbps]) and a tape tension control means 17 for controlling a tape tension applied to the magnetic recording tape 2 in accordance with a data rate (256, 128, 64, 32, 16 and 10 [Mbps]) supplied from the data rate detection means, whereby the distance between the recording track recorded on the magnetic recording medium and the CTL signal corresponding to the recording track is substantially uniformly controlled.

The distance d between the recording track TR recorded on the magnetic recording tape 2 and the CTL signal corresponding to the recording track TR can be made substantially uniform by setting and controlling the value of a tape tension applied to the magnetic recording tape 2 in accordance with the data rate (256, 128, 64, 32, 16 and 10 [Mbps]) of the data to be recorded or reproduced for all of these data rates and the inclination of the recording track TR recorded on the magnetic recording tape 2 can be made substantially uniform, and thus compatibility of recording or reproducing of the data at different data rates can be improved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a table showing an embodiment of tape tension values according to the present invention;

FIG. 5 is a waveform diagram showing the amount of dislocation in a track height direction of a recording track conventionally recorded at a relative speed of 1/1 times;

FIG. 6 is a waveform diagram showing the amount of dislocation in a track height direction of a recording track recorded at a relative speed of 1/1 times in the embodiment;

DETAILED DESCRIPTION OF THE INVENTION

Figure 1:
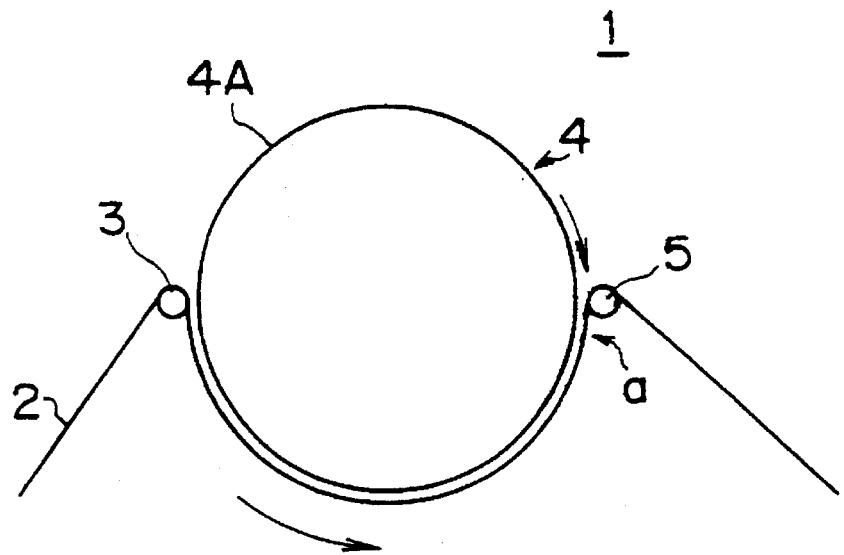
FIG. 1 is a schematic diagram for explaining an air flow drawn in by a magnetic tape.
Figure 2:
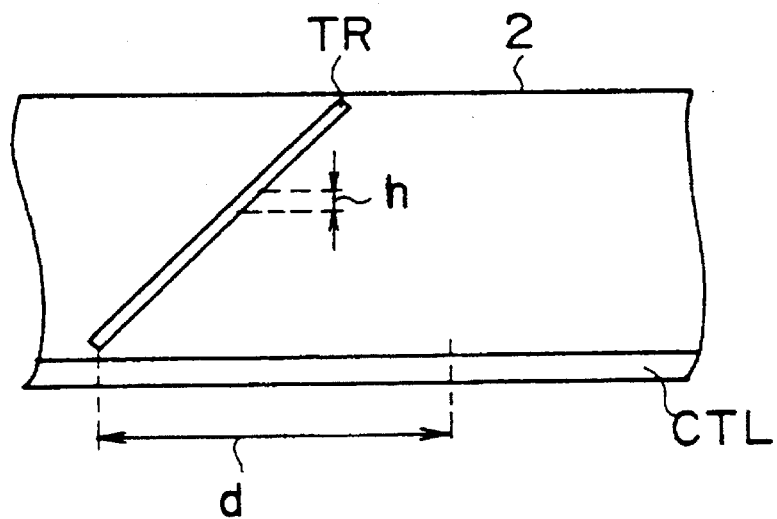
FIG. 2 is a schematic diagram for explaining a change in linearity of a recording track and an amount of dislocation of a CTL distance.
Figure 3:
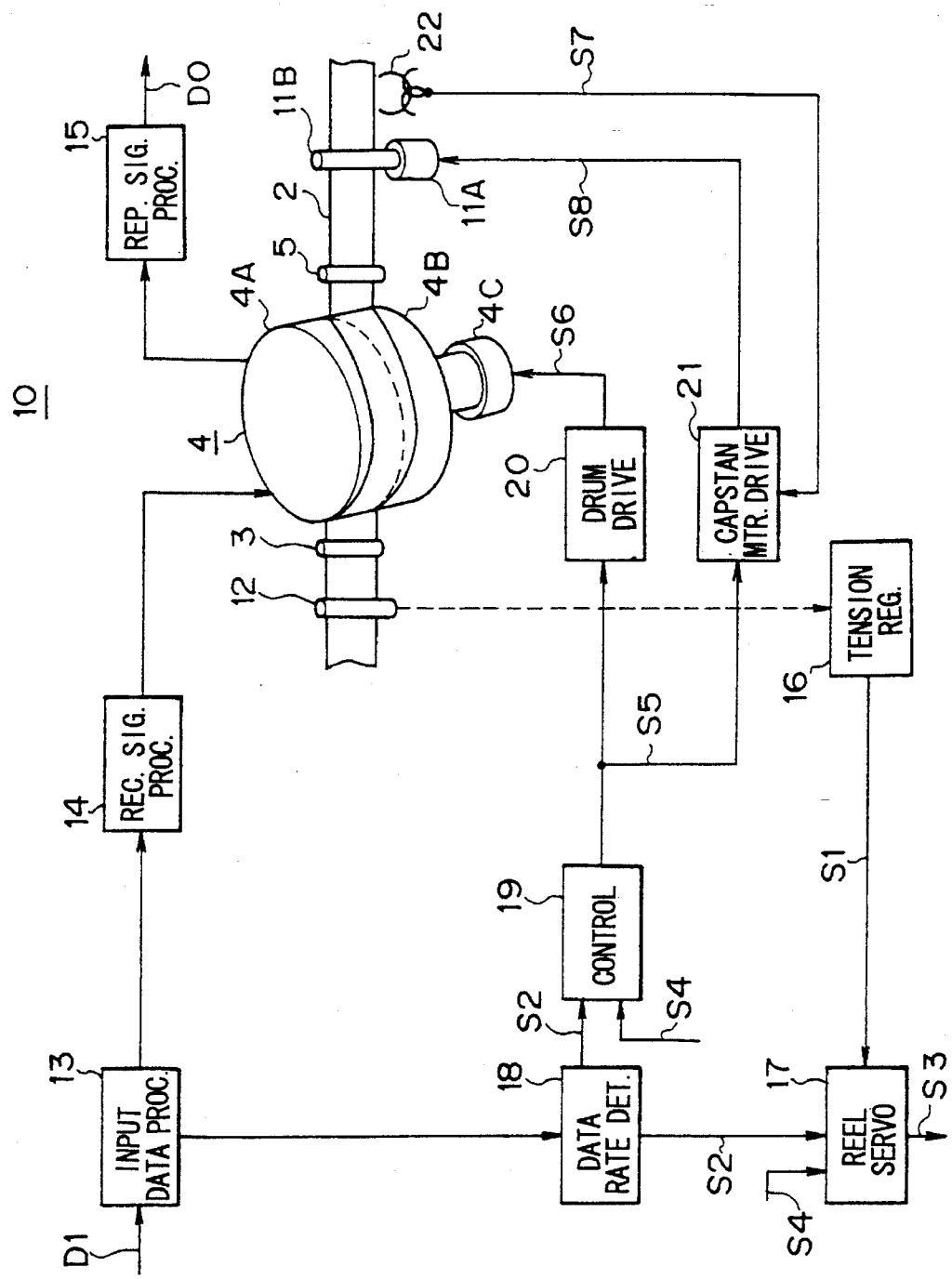
FIG. 3 is a block diagram showing an embodiment of a magnetic recording and/or reproducing apparatus according to the present invention.

Preferred embodiments of this invention will be described with reference to the accompanying drawings:

In FIG. 3 wherein the same reference numerals as used in FIG. 1 are used to designate the same parts, a data recorder 10 records an input data signal D1 input sequentially through an input data processing circuit 13 and recording signal processing circuit 14 on the magnetic tape 2 by using a predetermined recording wavelength and reproduces this data through a reproduction signal processing circuit 15 at a desired data rate and outputs same as an output data signal DO.

A capstan 11B to be rotated by a capstan motor 11A is disposed on the winding reel side of a drum unit 4 to feed the magnetic tape 2 at a tape speed corresponding to respective data rates (256, 128, 64, 32, 16 and 10 [Mbps]).

A tension pole 12 is disposed at the supply reel side of the drum unit 4 so that it slides on the magnetic tape 2, and on detecting the tape tension of the magnetic tape 2 through the tension pole 12, a tension regulator 16 supplies the detected result to a reel servo circuit 17 as a tension signal S1.

On detecting a recording data rate from the input data signal D1 input through the input data processing circuit 13, a data rate detection circuit 18 supplies the detected result to a reel servo circuit 17 as a detected data rate signal S2.

At this time, the reel servo circuit 17 controls the tape tension by supplying a servo signal S3 to the supply reel so that the detected tape tension value of the tension signal S1 input from the tension regulator 16 coincides with a tape tension value corresponding to the recording data rate of the input data signal D1.

Incidentally, when the rotating speed of the rotary drum 4A is increased while the tape tension is kept uniform, the magnetic tape 2 is dislocated in a direction for increasing the CTL distance d and the linearity of the recording track TR tends to be inclined in a direction for increasing the effective diameter of the drum, whereas when the tape tension is increased while the rotating speed is kept uniform, the magnetic tape 2 is dislocated in a direction for reducing the CTL distance d and the linearity of the recording track TR tends to be inclined in a direction for reducing the effective diameter of the drum.

Thus, when the data rate is high (when the drum rotates at a high speed), the reel servo circuit 17 corrects the CTL distance d and the linearity of the recording track TR by increasing the tape tension, whereas when the data rate is low (when the drum rotates at a low speed), the reel servo circuit 17 corrects the CTL distance d and the linearity of the recording track TR by reducing the tape tension.

More specifically, as shown in FIG. 4, when the data rate is 256 [Mbps] (at a relative speed of 1/1 times), the reel servo circuit 17 sets the tape tension to 42 [g]. When the data rate is 128 [Mbps] (at a relative speed of 1/2 times), the reel servo circuit 17 sets the tape tension to 32 [g]. When the data rate is 64 [Mbps] (at a relative speed of 1/4 times), the reel servo circuit 17 sets the tape tension to 30 [g]. When the data rate is 32 [Mbps] (at a relative speed of 1/8 times), the reel support circuit 17 sets the tape tension to 30 [g]. When the data rate is 16 [Mbps] (at a relative speed of 1/16 times), the reel servo circuit 17 sets the tape tension to 28 [g]. And when the data rate is 10 [Mbps] (at a relative speed of 1/24 times), the reel servo circuit 17 sets the tape tension to 28 [g].

When the recording data rate is automatically detected, a control circuit 19 supplies a control signal S5 to a rotary drum drive circuit 20 and capstan motor drive circuit 21 based on the data rate detected from the detected data rate signal S2 input from the data rate detection circuit 18, or when the data rate is manually input, the control circuit 19 supplies the control signal S5 to the rotary drum drive circuit 20 and capstan motor drive circuit 21 based on the data rate according to a set data rate signal S4 input externally.

The rotary drum drive circuit 20 outputs a servo signal S6 to a drum motor 4C based on the control signal S5 and controls the rotating speed of the rotary drum 4A so as to be a rotating speed corresponding to a recording or reproducing data rate (256, 128, 64, 32, 16 and 10 [Mbps]).

When the data rate signal S5 is input or a control signal S7 detected in a reproducing operation is input from a control head 22, the capstan motor drive circuit 21 outputs a capstan servo signal S8 to a capstan motor 11A to control the traveling speed of the magnetic tape 2 so as to be a traveling speed corresponding to the recording or reproducing data rate (256, 128, 64, 32, 16 and 10 [Mbps]).

In the above arrangement, when the input data signal D1 is recorded on the magnetic tape 2, the data recorder 10 detects whether the data rate of the input data signal D1 is any one of 256, 128, 64, 32, 16 and 10 [Mbps] in the data rate detection circuit 18.

On detecting that the data rate of the input data signal D1 is 256 [Mbps], for example, the data rate detection circuit 18 sets the drum rotating speed, tape traveling speed and tape tension to respective values that correspond to the relative speed of 1/1 times.

More specifically, the data rate detection circuit 18 controls the rotating speed of the rotary drum 4A and the rotating speed of the capstan motor 11A to the relative speed of 1/1 times by outputting the detected data rate signal S2 to the control circuit 19 and outputting the control signal S5 to the rotary drum drive circuit 20 and capstan motor drive circuit 21 through the control circuit 19.

The reel servo circuit 17 then determines that the tape tension value must be set to 42 [g] based on the detected data rate signal S2 input and controls the tape tension by outputting the reel servo signal S3 so that the value of the tension signal S1 is kept to 42 [g].

As a result, when the linearity of the recording track TR formed on the magnetic tape 2 was measured by a CTL traverse method, the recording track TR, which had a linearity inclined downwardly toward the right (FIG. 5) if recorded in the conventional manner, was recorded substantially horizontally as shown in FIG. 6.

Further, when the amount of dislocation of the CTL distance d was measured at that time, the conventional amount of dislocation of 3 [μm] (FIG. 5) in the track height direction could be reduced to substantially 0 [μm] (FIG. 6).

Conversely, when the input data signal D1 is input at 128 [Mbps], the data rate detection circuit 18 outputs the detected data rate signal S2 by determining that the relative speed ratio is 1/2.

The data recorder 10 outputs the data rate signal S5 to the rotary drum drive circuit 20 and capstan motor drive circuit 21 through the control circuit 19 and sets the rotating speed of the rotary drum 4A and the rotating speed of the capstan motor 11A to 1/2 times the standard relative speed of 1/1 times.

In this case, the reel servo circuit 17 determines that the tape tension value must be set to 32 [g] and controls the supply reel by outputting the servo signal S3 so that the tension signal S1 is maintained at 32 [g].

Figure 7:
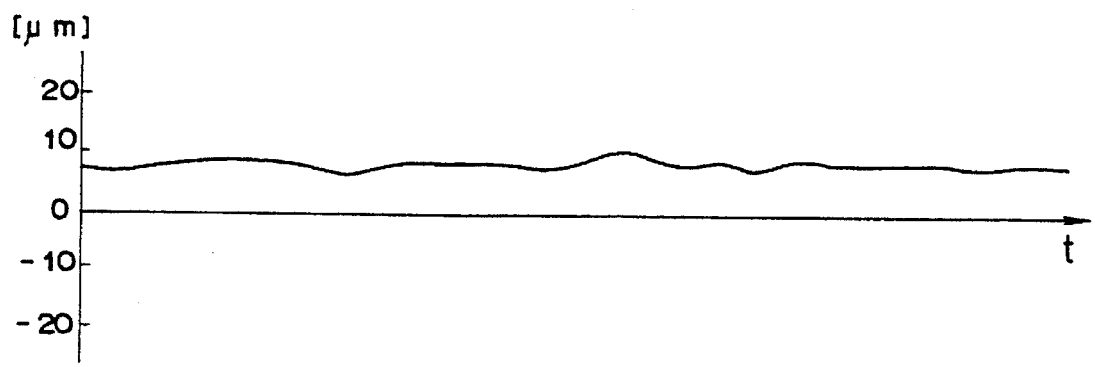
FIG. 7 is a waveform diagram showing the amount of dislocation in a track height direction of a recording track conventionally recorded at a relative speed of 1/2 times.
Figure 8:
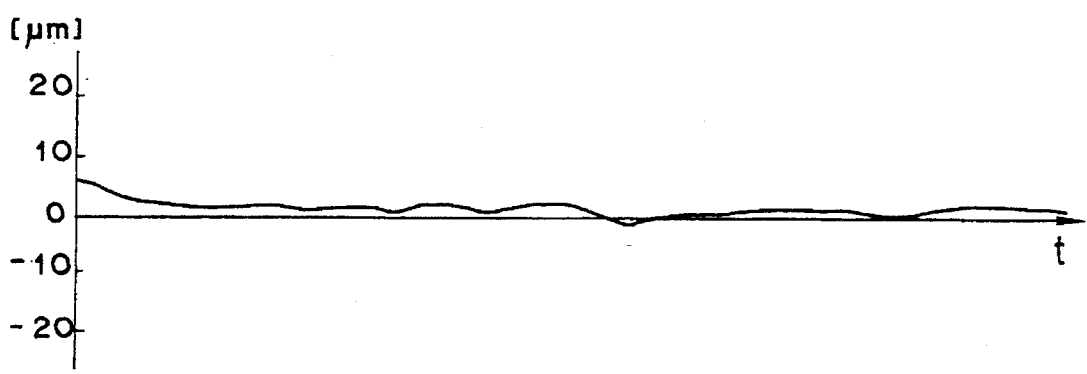
FIG. 8 is a waveform diagram showing the amount of dislocation in a track height direction of a recording track recorded at a relative speed of 1/2 times in the embodiment.

Again as a result, and measuring the linearity of the recording track formed on the magnetic tape 2 by the CTL traverse method, the recording track TR, which had a dislocation of the CTL distance d of 8 [μm] in the track height direction and was inclined downward toward the right (FIG. 7) when recorded in the conventional manner could be corrected so that the amount of dislocation thereof in the track height direction was substantially 0 [μm], i.e., the amount of dislocation of the CTL distance was substantially 0 and the inclination of the recording track TR was made substantially horizontal as shown in FIG. 8.

In the same way as the above, when the input data signal D1 is input at 64 [Mbps], the reel servo circuit 17 operates so that the tape tension value is set to 30 [g]; when the input data signal D1 is input at 32 [Mbps], the reel servo circuit 17 operates so that the tape tension value is set to 30 [g]; when the input data signal D1 is input at 16 [Mbps], the reel servo circuit 17 operates so that the tape tension value is set to 28 [g]; and when the input data signal D1 is input at 10 [Mbps], the reel servo circuit 17 operates so that the tape tension value is set to 28 [g].

Using the CTL transverse method to detect the inclination of the recording track TR formed on the magnetic tape 2, the recording track TR can be substantially uniformly recorded regardless of the data rate of 64 [Mbps], 32 [Mbps], 16 [Mbps], and 10 [Mbps].

More specifically, the inclination of the recording track TR formed on the magnetic tape 2 is made substantially horizontal for each data rate to provide a similar linearity and dislocation h in the tack height direction, i.e., dislocation of the CTL distance d, can be substantially eliminated.

In addition, with these tape tension values a desired tent shape of the magnetic tape 2 is formed when a magnetic head slides on the magnetic tape 2 so that the contact of the magnetic head with the tape is improved and data can be reliably recorded.

As a result, the data recorder 10 can form the recording track TR which has a substantially uniform linearity and less dislocation of the CTL distance d regardless of the data rate of input data and the recording wavelength.

Conversely, when the data recorded on the magnetic tape 2 is reproduced, the data recorder 10 reproduces the data based on the data rate designated by the reproduction data rate signal S4 manually input to the reel servo circuit 17 and control circuit 19.

More specifically, on detecting that a reproducing operation is to be carried out at 256 [Mbps], the tape recorder 10 outputs the control signal S5 from the control circuit 19 to the rotary drum drive circuit 10 and capstan motor drive circuit 21 to control the rotating speed of the rotary drum 4A and tape traveling speed to a rotating speed and traveling speed corresponding to a relative speed of 1/1 times.

Further, the reel servo circuits 17 outputs the reel servo signal S3 so that the tension value detected from the tension pole 12 is maintained at 42 [g] and causes the magnetic head to execute an accurate scanning along the linearly formed recording track TR in the same way as when a recording operation is carried out so that the CTL distance d is not dislocated.

With this arrangement, the data can be reproduced at the data rate of 256 [Mbps] regardless of the data rate at the time of recording.

Further, as with reproduction at 256 [Mbps], when reproduction is designated to be carried out at 128 [Mbps], 64 [Mbps], 32 [Mbps], 16 [Mbps] and 10 [Mbps], the rotary drum drive circuit 20 and capstan motor drive circuit 21 set the rotating speed of the rotary drum 4A and tape traveling speed values which correspond to a relative speed of 1/2, 1/4, 1/8, 1/16 and 1/24 times, respectively.

In addition, the reel servo circuit 17 controls the tension value so that it is 32 [g], 30 [g], 30 [g], 28 [g] and 28 [g] according to FIG. 4.

With this arrangement, the data recorder 10 can reproduce the data recorded on the magnetic tape 2 at a desired data rate.

Also, since the tape tension value is set to a value set in accordance with each data rate so that the linearity of the recording track TR is made uniform and the dislocation of the CTL distance d is substantially eliminated regardless of the data rate, the compatibility among respective data rates can be improved as compared to conventional data recorders, whether the data is to be recorded or reproduced.

Although a so-called upper drum rotation type drum unit, with rotary drum 4A and a fixed drum 4B, is employed as the drum unit 4 in the above example, the present invention is not limited thereto and is applicable to a so-called central drum rotation type drum unit composed of a rotary disk held between upper and lower fixed drums and the like.

In addition, although specific tape tension values corresponding to specific data rates are set forth as shown in FIG. 4 in the above embodiment, the present invention is not limited thereto and the tape tension values may be set to other values so that the CTL distance d is made uniform and the linearity of the recording track is improved.

Further, although the case in which the data rate is automatically determined in a recording operation and manually input in a reproducing operation is described in the above embodiment, the present invention is not limited thereto and the input of the data rate can be performed in various ways, such as the case in which the data rate is automatically determined when both recording and reproducing operations are carried out, and the like.

Further, although data rates at which the data is to be recorded and reproduced to or from the data recorder 10 are given as 256, 128, 64, 32, 16 and 10 [Mbps] in the above embodiment, the present invention is not limited thereto and the present invention can be applied with similar effect to a data recorder in which the data rates are 88, 44, 22, 11, 5.50 and 3.67 [Mbps].

Further, although the specific embodiment of the present invention described herein relates to a data recorder by which, for example, observation data and measured data are recorded or reproduced, the present invention is not limited thereto and is widely applicable to magnetic recording and/or reproducing apparatus capable of recording a video signal and audio signal at variable speeds.

As described above, according to the present invention, the values of a tape tension applied to a magnetic recording medium are set in accordance with the data rates of data to be recorded or reproduced so that the data can be recorded with the distance between a recording track and a CTL signal corresponding to the recording track kept substantially uniform regardless of the data rate, whereby compatibility among different data rates can be improved.

While there have been described herein certain preferred embodiments of the invention, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. A magnetic recording apparatus for recording input data on a magnetic tape at variable data rates, comprising:
   a rotary magnetic head drum around which said magnetic tape is wrapped;
   means for detecting a data rate of said input data;
   means responsive to said means for detecting for advancing said magnetic tape relative to said rotary drum at a tape advancement rate and for setting the tape advancement rate in accordance with said data rate detected by said means for detecting;
   means responsive to said means for detecting for rotating said rotary drum at a rotation rate and for setting the rotation rate in accordance with said data rate detected by said means for detecting; and
   means responsive to said means for detecting for selecting a desired tape tension value in accordance with said data rate detected by said means for detecting and for controlling tension in said magnetic tape so that said tension is in accordance with said desired tape tension value.

2. A magnetic reproducing apparatus for reproducing data from a magnetic tape at variable data rates, comprising:
   a rotary magnetic head drum around which said magnetic tape is wrapped;
   data rate selection means for selecting a data rate at which said data is to be reproduced;
   means responsive to said data rate selection means for advancing said magnetic tape relative to said rotary drum at a tape advancement rate and for setting the tape advancement rate in accordance with said data rate selected by said data rate selection means;
   means responsive to said data rate selection means for rotating said rotary drum at a rotation rate and for setting the rotation rate in accordance with said data rate selected by said data rate selection means; and
   means responsive to said data rate selection means for selecting a desired tape tension value in accordance with said data rate selected by said data rate selection means and fox controlling tension in said magnetic tape so that said tension is in accordance with said desired tape tension value.

3. A magnetic reproducing apparatus according to claim 2, wherein said data rate is selected on the basis of a manually input signal.

* * * * *